United States Patent
Yoo et al.

(10) Patent No.: US 9,444,778 B2
(45) Date of Patent: Sep. 13, 2016

(54) METHOD AND APPARATUS FOR PROPAGATING A MESSAGE IN A SOCIAL NETWORK

(71) Applicant: Foundation of Soongsil University-Industry Cooperation, Seoul (KR)

(72) Inventors: Myungsik Yoo, Seoul (KR); Duy-Linh Nguyen, Seoul (KR); Wenji Quan, Seoul (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 144 days.

(21) Appl. No.: 14/302,790

(22) Filed: Jun. 12, 2014

(65) Prior Publication Data

US 2014/0372542 A1    Dec. 18, 2014

(30) Foreign Application Priority Data

Jun. 12, 2013    (KR) ........................ 10-2013-0067205

(51) Int. Cl.
    *G06F 15/16*    (2006.01)
    *H04L 12/58*    (2006.01)

(52) U.S. Cl.
    CPC ..................................... *H04L 51/32* (2013.01)

(58) Field of Classification Search
    None
    See application file for complete search history.

(56) References Cited

U.S. PATENT DOCUMENTS

| | | | | |
|---|---|---|---|---|
| 8,306,922 B1* | 11/2012 | Kunal | ................... | G06Q 30/02 705/319 |
| 8,332,512 B1* | 12/2012 | Wu | ................... | G06Q 30/0254 705/319 |
| 2006/0218577 A1* | 9/2006 | Goodman | ................... | G06Q 30/02 725/32 |
| 2007/0266097 A1* | 11/2007 | Harik | ................... | G06Q 30/02 709/204 |
| 2008/0147482 A1* | 6/2008 | Messing | ................... | G06Q 30/02 705/14.53 |
| 2009/0271289 A1* | 10/2009 | Klinger | ................... | G06Q 30/0601 705/26.1 |
| 2010/0228614 A1* | 9/2010 | Zhang | ................... | G06Q 10/10 705/14.16 |
| 2010/0228631 A1* | 9/2010 | Zhang | ................... | G06Q 30/0269 705/14.66 |
| 2010/0332312 A1* | 12/2010 | Klinger | ................... | G06Q 10/10 705/14.43 |
| 2011/0282743 A1* | 11/2011 | Gerdes | ................... | G06Q 30/0257 705/14.55 |
| 2012/0158499 A1* | 6/2012 | Banadaki | ................... | G06Q 30/0254 705/14.52 |
| 2012/0158630 A1* | 6/2012 | Zaman | ................... | G06Q 30/02 706/21 |
| 2013/0091222 A1* | 4/2013 | Brayman | ................... | H04L 12/1859 709/204 |
| 2013/0311582 A1* | 11/2013 | Thai | ................... | H04L 51/32 709/206 |
| 2014/0019264 A1* | 1/2014 | Wachman | ................... | G06Q 30/0276 705/14.72 |

FOREIGN PATENT DOCUMENTS

WO    WO 2010099631 A1 *  9/2010 ............. G06Q 30/02

* cited by examiner

*Primary Examiner* — Brian P Whipple
(74) *Attorney, Agent, or Firm* — Mintz Levin Cohn Ferris Glovsky and Popeo, P.C.; Kongsik Kim; Jonathon Western

(57) ABSTRACT

A method and an apparatus for propagating a message in a social network are disclosed. A method for propagating a message in a social network according to an embodiment of the invention can include: calculating a degree of connectivity of each user; calculating a propagation capability of each user by using the calculated degree of connectivity and a probability of distribution; choosing target users for propagating a message by using the propagation capability of each user; and propagating the message to nodes of the chosen target users.

7 Claims, 3 Drawing Sheets

METHOD AND APPARATUS FOR PROPAGATING A MESSAGE IN A SOCIAL NETWORK

CROSS-REFERENCE TO RELATED APPLICATIONS

This application claims the benefit of Korean Patent Application No. 10-2013-0067205, filed with the Korean Intellectual Property Office on Jun. 12, 2013, the disclosure of which is incorporated herein by reference in its entirety.

BACKGROUND

1. Technical Field

The present invention relates to a social network, more particularly to a method and apparatus for propagating a message in a social network that chooses users (nodes) having high propagation capabilities, in consideration of the connectivity and distribution probability of each user, to enable faster propagation of the message.

2. Description of the Related Art

The social network service (SNS) is being established as one of the most popular forms of media in the Internet generation since the advent of Web 2.0. A social network service provides an online platform that allows people to meet, interact, and form relationships. This new form of social interaction has led to the formation of various social networks online, as well as numerous social network services.

Such social networks, which have brought about several innovations to existing methods of communication, are generally operated globally and have members numbering into the hundred millions. For instance, Facebook, one of the most popular social network services worldwide, is said to have approximately 900 million members worldwide.

According to the related art, a search for members who have great influence in a social network may involve calculating the users' degree of influence by using the users' connectivity. FIG. 1 is a diagram illustrating a method of calculating a user's degree of influence in a social network according to the related art.

Referring to FIG. 1, suppose that A, B, C, and D are users in a social network, and suppose that e1, e2, e3, and e4 are relationships between the respective users. A conventional method may calculate the degree of influence of each user based only on the user's degree of connectivity. If a social network is formed as in FIG. 1, the conventional method may determine that user A is the most influential, as A has the most number of connections.

However, due to the characteristics of social networks, various other factors contribute to a user's influence, and determining a social network user's influence using only the user's degree of connectivity would not suitably reflect these other factors.

SUMMARY

An aspect of the invention is to provide a method and an apparatus for propagating a message in a social network that can distribute a message quickly by calculating the propagation capability of each user in consideration of the connectivity and the distribution probability of the user and selecting the users (nodes) for propagating the message based thereon.

An aspect of the invention provides a method that can distribute a message quickly in a social network by considering the degree of connectivity and the probability of distribution of each user and selecting nodes that have high degrees of influence as the nodes for propagating the message.

A method for propagating data in a social network according to an embodiment of the invention can include: calculating a degree of connectivity of each user; calculating a propagation capability of each user by using the calculated degree of connectivity and a probability of distribution; choosing target users for propagating a message by using the propagation capability of each user; and propagating the message to nodes of the chosen target users.

The degree of connectivity may be calculated based on the number of friends of each user.

The operation of choosing the target users may include: arranging users in descending order of propagation capability; and choosing non-adjacent users having the highest propagation capabilities as the target users for propagating the message.

The propagation capability may be calculated by using the equation shown below:

$$dp_v = d_v + \alpha \sum_{w \in N(v)} P_{v,w}$$

wherein v represents each terminal, w represents a terminal adjacent to each terminal, $d_v$ represents the degree of connectivity of terminal v, $\alpha$ represents a weight, $P_{v,w}$ represents the probability of distribution to a neighboring terminal w, and N(v) represents a set of terminals adjacent to terminal v.

Another aspect of the invention provides an apparatus that can distribute a message quickly in a social network by considering the degree of connectivity and the propagation capability of each user in selecting the terminals that will propagate the message.

An apparatus for propagating data in a social network according to an embodiment of the invention can include: a first computing unit configured to calculate a degree of connectivity of each user; a second computing unit configured to calculate a propagation capability of each user by using the calculated degree of connectivity and a probability of distribution; and a control unit configured to choose target users for propagating a message by using the propagation capability of each user and configured to provide control such that the message is propagated to nodes corresponding to the chosen target users.

The control unit can arrange users in a descending order of the propagation capability and then choose non-adjacent users having the highest propagation capabilities as the target users for propagating the message.

The apparatus can further include a communication unit configured to propagate the message to a node according to the control of the control unit.

A node corresponding to each user can be in a deactivated state and can be changed to an activated state when accepting a message.

With the method and apparatus for propagating a message in a social network according to an embodiment of the invention, a message can be distributed quickly, since nodes that have high degrees of influence are selected as the nodes for propagating the message in consideration of the degree of connectivity and the probability of distribution of each user.

Additional aspects and advantages of the present invention will be set forth in part in the description which follows, and in part will be obvious from the description, or may be learned by practice of the invention.

DETAILED DESCRIPTION

Figure 1:
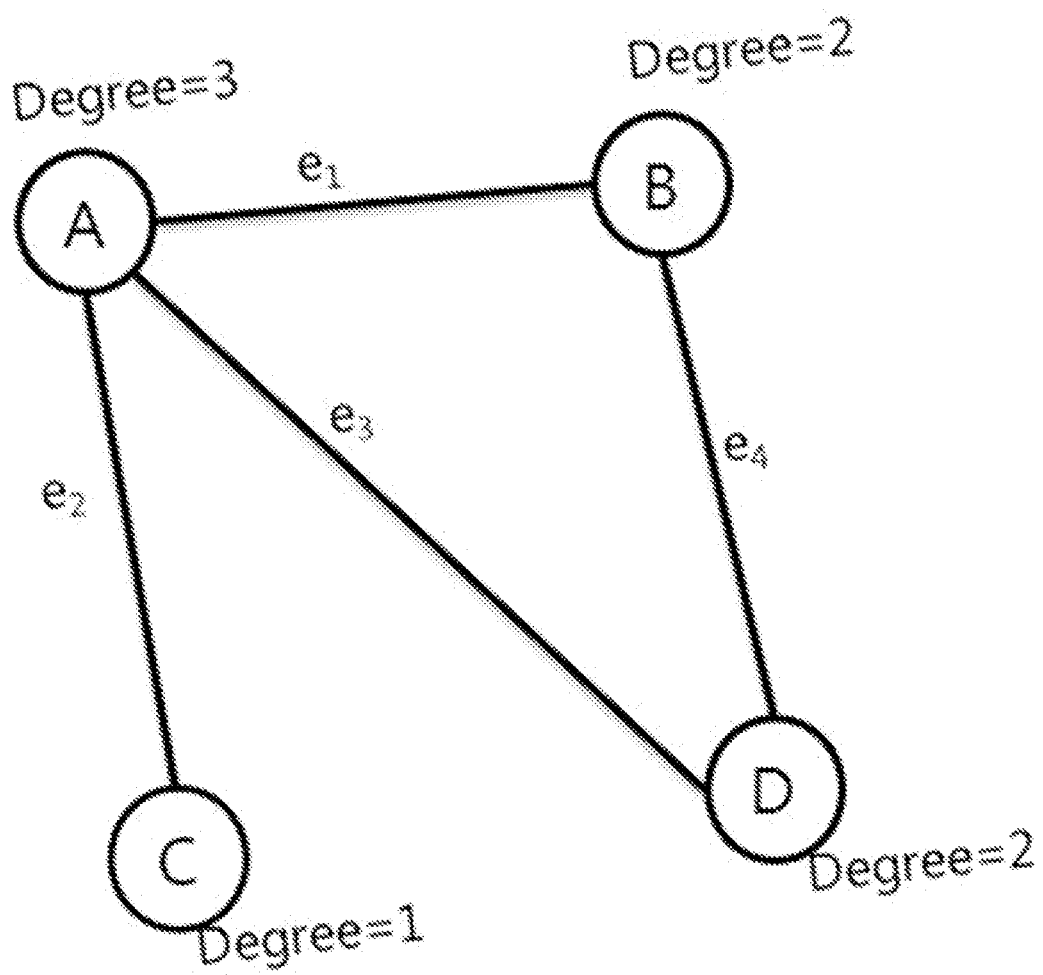
FIG. 1 is a diagram illustrating a method of calculating a user's degree of influence in a social network according to the related art.

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In the written description, certain detailed explanations of related art are omitted when it is deemed that they may unnecessarily obscure the essence of the present invention.

While such terms as "first" and "second," etc., may be used to describe various components, such components must not be limited to the above terms. The above terms are used only to distinguish one component from another.

The terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The present invention relates to distributing messages quickly in a social network by searching for the users (nodes) that have the greatest influence in the social network in consideration of the connectivity and propagation capability of each user.

A detailed description of certain embodiments of the invention is provided below with reference to the accompanying drawings.

Figure 2:
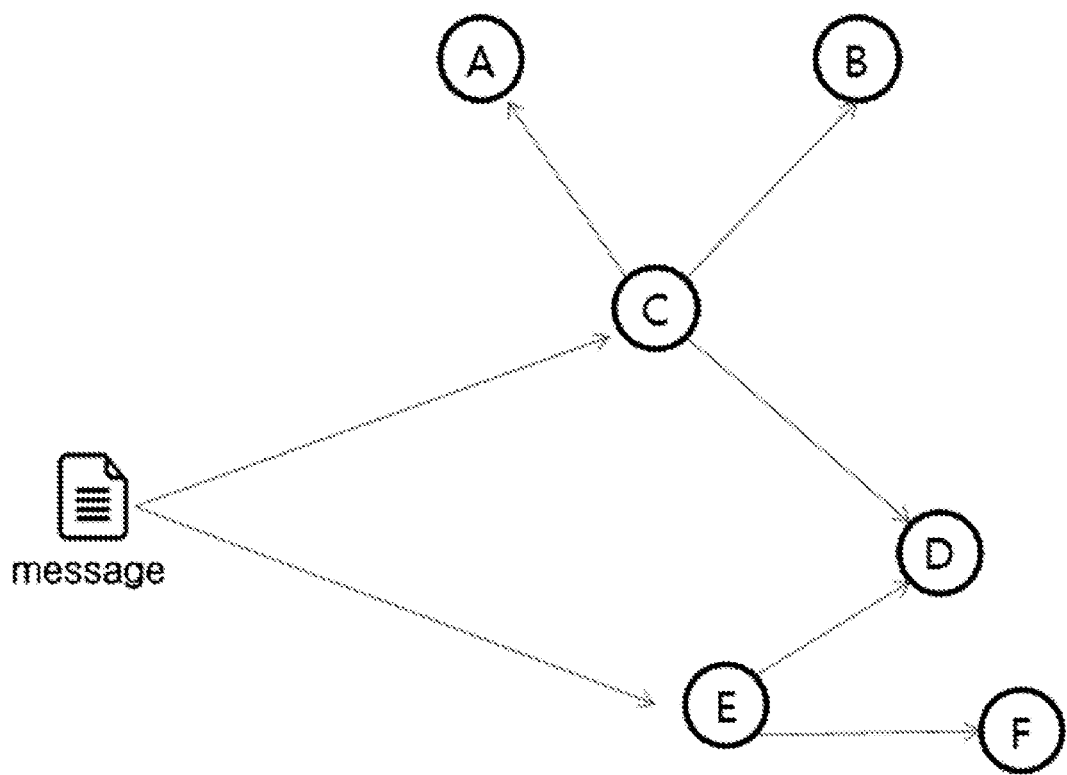
FIG. 2 schematically illustrates the structure of a social network for explaining a mode of distributing a message according to an embodiment of the invention.

FIG. 2 schematically illustrates the structure of a social network for explaining a mode of distributing a message according to an embodiment of the invention.

For convenient description and easier understanding, the terms "user" and "node" will be used interchangeably in the present specification according to the context. The terms "user" and "node" should be understood as having the same meaning.

For easier understanding, suppose that a social network according to an embodiment of the invention includes users (nodes) A, B, C, D, E, and E. Of course, the structure of an actual social network is much more complicated and may be formed with multiply layered relationships.

In order to distribute a message quickly in such a social network, the message may be propagated via suitable users (nodes) that are searched and selected in consideration of the connectivity and propagation capability of each user. To this end, an embodiment of the invention can involve calculating the degree of connectivity and the propagation capability of each user, and choosing non-adjacent users (nodes) having the highest propagation capabilities as the users (nodes) for propagating the message.

If a user (node) selected for propagating the message accepts the message, then the node (user) can be changed from a deactivated state to an activated state.

Accordingly, in order to propagate a message quickly and efficiently, the message may be propagated via those users (nodes) that are not adjacent to one another and that have high propagation capabilities with respect to users (nodes) set to a deactivated state.

A more detailed description is provided below on a method of choosing users (nodes) having high levels of influence in consideration of the users' connectivity and propagation capabilities.

Figure 3:
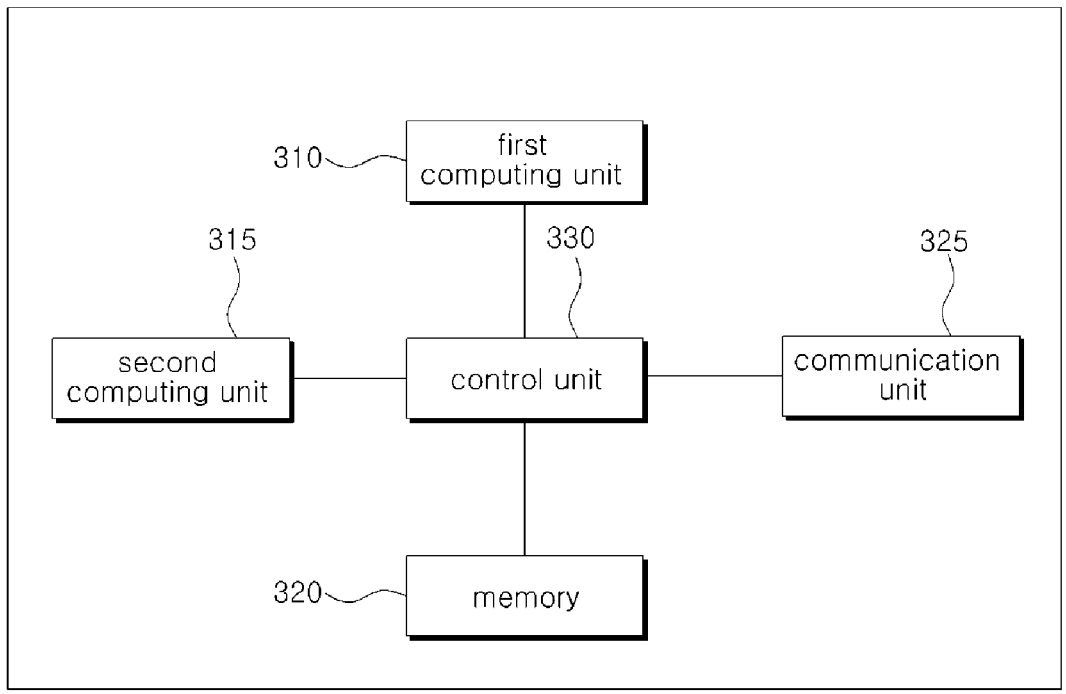
FIG. 3 is a block diagram schematically illustrating the internal composition of an apparatus for propagating a message according to an embodiment of the invention.

FIG. 3 is a block diagram schematically illustrating the internal composition of an apparatus for propagating a message according to an embodiment of the invention. Here, the message propagation apparatus 300 can be an arbitrary node for choosing the users for propagating a message in a social network or can be a separate external device other than a node.

Referring to FIG. 3, a message propagation apparatus 300 according to an embodiment of the invention may include a first computing unit 310, a second computing unit 315, a communication unit 320, a memory 325, and a control unit 330.

The first computing unit 310 may serve to calculate the degree of connectivity of each user included in the social network.

Here, the degree of connectivity of each user may be a measure of how many friends the user has and, for example, can be the number of friends of each user. According to an embodiment of the invention, the degree of connectivity of each user can be the number of friends included in the user's buddy list. In another example, the degree of connectivity of each user can be the number of users who have added the user as a friend.

In another example, the degree of connectivity of each user can be the sum of the number of friends included in the user's buddy list and the number of users who have added the user as a friend. In cases where the degree of connectivity of each user is calculated by adding the number of friends included in the user's buddy list and the number of users who have added the user as a friend, overlapping connections can be excluded. For instance, consider an example in which a first user has a second user added as a friend in the buddy list, and the second user also has the first user added as a friend, while a third user has the first user added as a friend, but the first user does not have the third user added as a friend. When calculating the degree of connectivity of the first user for this case, the overlap may be removed for the first user and the second user, since the first user and the second user both have each other counted as a friend, and the relationship between the first user and the second user can be counted as one relationship. Also counting the connection between the first user and the third user, the degree of connectivity of the first user can be calculated as 2.

The second computing unit 315 may serve to calculate the propagation capability of each user, using the degree of connectivity of each user calculated by the first computing unit 310.

For example, the second computing unit 315 can calculate the propagation capability of each user by using Equation 1 shown below.

$$dp_v = d_v + \alpha \sum_{w \in N(v)} P_{v,w}$$ [Equation 1]

Here, v represents a user, w represents a user adjacent to user v, $d_v$ represents the degree of connectivity of user v, α represents a weight, $P_{v,w}$ represents the probability of distribution between user v and user w, and N(v) represents a set of users that are adjacent to user v. The probability of distribution is the probability that a message will be accepted between the respective users, and can represent the level of friendship between the users in the social network or the level of interest in the message.

For example, the degree of connectivity (e.g. number of friends) of a user may be greater than 1, while the probability of distribution may be lower than 1. Thus, a weight α may be set to treat the degree of connectivity and the probability of distribution of the user equally (fairly) in calculating the propagation capability.

The second computing unit 315 can calculate the propagation capability of each user by using the degree of connectivity of each user, such as in Equation 1 above.

The communication unit 320 may serve to receive a message from another node included in the social network or propagate a message to another node, according to the control of the control unit 330.

The memory 325 may serve to store the various algorithms, structure of the social network, and user information required for operating the message propagation apparatus 300 according to an embodiment of the invention.

The control unit 330 may serve to control the internal components (e.g. the first computing unit 310, second computing unit 315, communication unit 320, memory 325, etc.) of the message propagation apparatus 300 according to an embodiment of the invention.

Also, the control unit 330 can choose the target nodes that can propagate a message most effectively, considering the propagation capability of each user as calculated by the second computing unit 315. For example, the control unit 330 can provide control such that the nodes having the best propagation capabilities are chosen as the target nodes to propagate the message.

More specifically, the control unit 330 can arrange the propagation capabilities of the users in descending order. Then, using the propagation capabilities of the users arranged thus, the control unit 330 can choose nodes, which are not adjacent to one another, in the order of highest to lowest propagation capability, to be the target nodes for propagating the message. Then, the control unit 330 can provide control such that the message is propagated to the target nodes.

Figure 4:
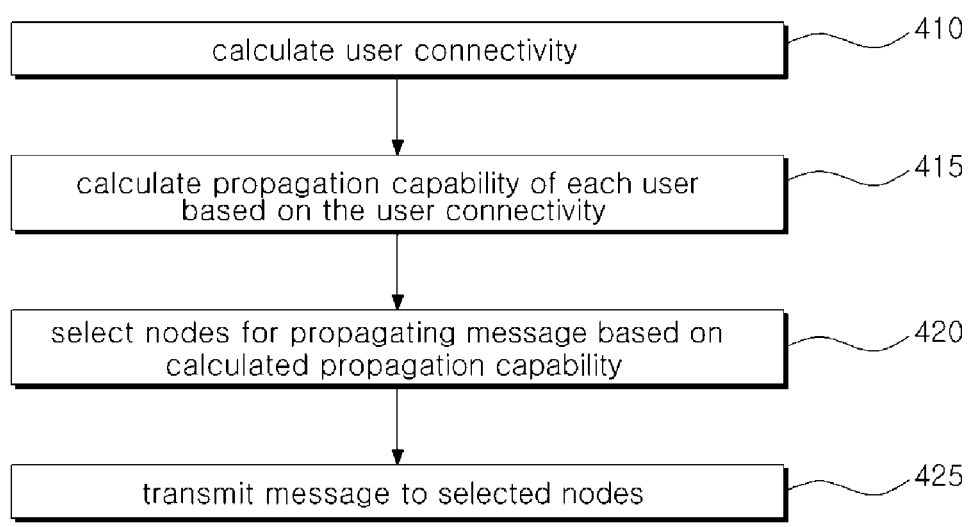
FIG. 4 is a flow diagram illustrating a method for propagating a message according to an embodiment of the invention.

FIG. 4 is a flow diagram illustrating a method for propagating a message according to an embodiment of the invention. A description is provided below of an efficient and quick method of propagating a message in a social network.

For convenience, it will be supposed that the message propagation apparatus 300 has received input of and is storing information on the social network structure and the information of each user (e.g. the number of users having high influence, etc.)

In operation 410, the message propagation apparatus 300 may calculate the degree of connectivity of each user included in the social network.

As described above, the degree of connectivity of each user may represent how many friends each user has in the social network. For example, the degree of connectivity of each user can be represented by the number of friends of the user.

That is, the message propagation apparatus 300 can calculate the degree of connectivity of each user by receiving relevant input beforehand or by using the stored information regarding the structure of the social network and user information.

In operation 415, the message propagation apparatus 300 may calculate the propagation capability of each user in consideration of the calculated degree of connectivity of each user.

Here, the message propagation apparatus 300 can calculate the propagation capability of each user in consideration of the probability of distribution, i.e. the probability of the message being accepted by the user, as well as the degree of connectivity of each user. The probability of distribution is the probability of distribution occurring between an arbitrary user and another user and may represent the probability that the message will be accepted.

Thus, the propagation capability of each user can be calculated based on the degree of connectivity of the user and the probability of the message being distributed when the user propagates a message.

The equation used by the message propagation apparatus 300 for calculating the propagation capability of each user in consideration of the degree of connectivity and the probability of distribution of each user can be identical to Equation 1 shown above. As such, redundant explanations are omitted.

In operation 420, the message propagation apparatus 300 may use the calculated propagation capability of each user to select the target users that will propagate the message.

More specifically, the message propagation apparatus 300 can arrange the propagation capabilities of the users in descending order, to arrange the users from highest to lowest propagation capability.

Then, using the propagation capabilities of the users arranged thus, the message propagation apparatus 300 can choose those users that are not adjacent to one another, in the order of highest to lowest propagation capability, to be the target nodes for propagating the message. For example, the message propagation apparatus 300 can select a first target user having a high propagation capability, and then select a user having the next highest propagation capability that is not adjacent to the first target user, as a second target user.

In operation 425, the message propagation apparatus 300 may propagate the message to nodes corresponding to the selected target users.

A method for propagating a message in a social network according to an embodiment of the present invention can be implemented in the form of program instructions that may be performed using various computer means and can be recorded in a computer-readable medium. Such a computer-readable medium can include program instructions, data files, data structures, etc., alone or in combination.

The program instructions recorded on the medium can be designed and configured specifically for the present invention or can be a type of medium known to and used by the skilled person in the field of computer software. Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc. Examples of the program of instructions may include not only machine language codes produced by a compiler but also high-level language codes that can be executed by a device for electronically processing information, such as a computer, through the use of an interpreter, etc.

The hardware mentioned above can be made to operate as one or more software modules that perform the actions of the embodiments of the invention, and vice versa.

While the present invention has been described above using particular examples, including specific elements, by way of limited embodiments and drawings, it is to be appreciated that these are provided merely to aid the overall understanding of the present invention, the present invention is not to be limited to the embodiments above, and various modifications and alterations can be made from the disclosures above by a person having ordinary skill in the technical field to which the present invention pertains. Therefore, the spirit of the present invention must not be limited to the embodiments described herein, and the scope of the present invention must be regarded as encompassing not only the claims set forth below, but also their equivalents and variations.

What is claimed is:

1. A method for operating a computing device comprising a memory and at least one processor, the method comprising:
    generating, by the at least one processor, a degree of connectivity of each terminal corresponding to a user in a social network;
    generating, by the at least one processor, a propagation capability of each terminal by using the generated degree of connectivity and a probability of distribution that is a probability that a message will be accepted between the respective terminals;
    determining, by the at least one processor, target terminals among each terminal for propagating a message in the social network by using the propagation capability of each terminal; and
    propagating, by the at least one processor, the message to terminals of the determined target terminals,
    wherein the determining of the target terminals includes:
        arranging each terminal in a descending order of the propagation capability; and
        determining non-adjacent terminals having the highest propagation capabilities as the target terminals for propagating the message in the social network based on the arranged order of propagation capability.

2. The method of claim 1, wherein the degree of connectivity of each terminal is generated by the at least one processor based on a number of friends in the social network of the user corresponding to each terminal.

3. The method of claim 1, wherein the propagation capability is generated by using an equation shown below:

$$dp_v = d_v + \alpha \sum_{w \in N(v)} P_{v,w}$$

wherein v represents each terminal, w represents a terminal adjacent to each terminal, $d_v$ represents the degree of connectivity of terminal v, $\alpha$ represents a weight, $P_{v,w}$ represents the probability of distribution to a neighboring terminal w, and N(v) represents a set of terminals adjacent to terminal v.

4. A non-transitory recorded medium tangibly embodying a program of instructions for operating a computing device comprising at least one processor, the program of instructions comprising instructions for:
    generating, by the at least one processor, a degree of connectivity of each terminal corresponding to a user in a social network;
    generating, by the at least one processor, a propagation capability of each terminal by using the generated degree of connectivity and a probability of distribution that is a probability that a message will be accepted between the respective terminals;
    determining, by the at least one processor, target terminals among each terminal for propagating a message in the social network by using the propagation capability of each terminal; and
    propagating, by the at least one processor, the message to terminals of the determined target terminals,
    wherein the determining of the target terminals includes:
        arranging each terminal in a descending order of the propagation capability; and
        determining non-adjacent terminals having the highest propagation capabilities as the target terminals for propagating the message in the social network based on the arranged order of propagation capability.

5. A computing device comprising:
    a memory configured to store program instructions; and
    at least one processor connected to the memory and configured to execute the program instructions, which when executed cause the at least one processor to:
        generate a degree of connectivity of each terminal corresponding to a user in a social network;
        generate a propagation capability of each terminal by using the generated degree of connectivity and a probability of distribution that is a probability that message will be accepted between the respective terminals;
        determine target terminals among each terminal for propagating a message in the social network by using the propagation capability of each terminal; and
        provide control such that the message is propagated to terminals of the determined target terminals,
    wherein the determining of the target terminals includes:
        arranging each terminal in a descending order of the propagation capability; and
        determining non-adjacent terminals having the highest propagation capabilities as the target terminals for propagating the message in the social network based on the arranged order of propagation capability.

6. The computing device of claim 5, further comprising:
    a communication unit connected to the at least one processor and configured to propagate the message to the terminals of the determined target terminals according to the control of the at least one processor.

7. The computing device of claim 5, wherein each terminal is in a deactivated state and is changed to an activated state when accepting a message.

* * * * *